US012151449B2

(12) United States Patent
Fox et al.

(10) Patent No.: US 12,151,449 B2
(45) Date of Patent: Nov. 26, 2024

(54) CASE-HANDLING SYSTEM WITH INDEPENDENTLY MOVABLE FLAP-SUPPRESSING DEVICES

(71) Applicant: Signode Industrial Group LLC, Tampa, FL (US)

(72) Inventors: Bryce J. Fox, Honesdale, PA (US); Robert Thane Rickard, Waymart, PA (US)

(73) Assignee: SIGNODE INDUSTRIAL GROUP LLC, Tampa, FL (US)

( * ) Notice: Subject to any disclaimer, the term of this patent is extended or adjusted under 35 U.S.C. 154(b) by 0 days.

(21) Appl. No.: 18/176,804

(22) Filed: Mar. 1, 2023

(65) Prior Publication Data

US 2023/0286242 A1 Sep. 14, 2023

Related U.S. Application Data

(60) Provisional application No. 63/269,013, filed on Mar. 8, 2022.

(51) Int. Cl.

| | |
|---|---|
| ***B31B 50/00*** | (2017.01) |
| ***B31B 50/94*** | (2017.01) |
| *B31B 110/35* | (2017.01) |

(52) U.S. Cl.

CPC ........ *B31B 50/0044* (2017.08); *B31B 50/006* (2017.08); *B31B 50/94* (2017.08); *B31B 2110/35* (2017.08)

(58) Field of Classification Search

None

See application file for complete search history.

(56) References Cited

U.S. PATENT DOCUMENTS

| | | | | |
|---|---|---|---|---|
| 3,032,947 A | | 5/1962 | Voller | |
| 4,422,282 A | * | 12/1983 | Marchetti | B65B 7/20 493/183 |
| 5,106,359 A | | 4/1992 | Lott | |
| 5,167,607 A | | 12/1992 | Larsen | |
| 5,826,408 A | | 10/1998 | Ford | |
| 6,070,396 A | | 6/2000 | Rinaldi et al. | |
| 6,669,616 B1 | | 12/2003 | Bierenacki et al. | |
| 7,269,933 B2 | | 9/2007 | Le | |

(Continued)

FOREIGN PATENT DOCUMENTS

| | | | | |
|---|---|---|---|---|
| FR | 2511341 A1 | * | 2/1983 | B65B 51/023 |
| GB | 2083435 A | | 3/1982 | |

OTHER PUBLICATIONS

"Extended European Search Report", from corresponding European Patent Application No. 23160754, filed Oct. 16, 2023.

(Continued)

*Primary Examiner* — Tanzim Imam

(74) *Attorney, Agent, or Firm* — Neal, Gerber & Eisenberg LLP

(57) ABSTRACT

Various embodiments provide a case-handling system including multiple flap-suppressing devices that can be vertically moved independently of one another to, when processing a case, enable the case-handling system to prepare for and receive the next case to-be-processed while the case-handling system is still folding the upper major flaps of the current case, which increases throughput.

16 Claims, 17 Drawing Sheets

(56) References Cited

U.S. PATENT DOCUMENTS

| | | | | |
|---|---|---|---|---|
| 7,278,248 | B2 * | 10/2007 | Vinh Le | B65B 59/02<br>53/136.3 |
| 7,338,423 | B2 | 3/2008 | Tisma et al. | |
| 7,828,708 | B2 | 11/2010 | Huang et al. | |
| 8,024,910 | B2 | 9/2011 | Graham et al. | |
| 9,718,570 | B1 | 8/2017 | Ortiz et al. | |
| 10,960,997 | B2 | 3/2021 | Tatsukawa | |
| 2022/0089308 | A1 | 3/2022 | Monti | |

OTHER PUBLICATIONS

"Auto Flap Folder With Taping", SGCE Packaging Machines, available at https://www.youtube.com/results?search_query=auto+flap+folder+with+taping, Apr. 16, 2021.

"LD24 Case Sealer", Little David Love Shaw, https://www.youtube.com/watch?v=zUtiJ64WyH0, available before the priority date of this patent application.

* cited by examiner

CASE-HANDLING SYSTEM WITH INDEPENDENTLY MOVABLE FLAP-SUPPRESSING DEVICES

PRIORITY

This application claims priority to and the benefit of U.S. Provisional Patent Application No. 63/269,013, filed Mar. 8, 2022, the entire contents of which is incorporated herein by reference.

FIELD

The present disclosure relates to case-handling systems, and more particularly to case-handling systems with multiple independently movable flap-suppressing devices.

BACKGROUND

Every day, companies around the world pack millions of items in cases (such as cases formed from corrugate) to prepare them for shipping. FIG. 1 shows an example prior art case C. The case C includes a first major side wall SW1, a second major side wall SW2, a first minor side wall EW1, a second minor side wall EW2, a first upper major flap UMa1, a second upper major flap UMa2, a first upper minor flap UMi1, a second upper minor flap UMi2, a first lower major flap LMa1 (numbered for ease of reference but not shown), a second lower major flap LMa2 (numbered for ease of reference but not shown), a first lower minor flap LMi1 (numbered for ease of reference but not shown), and a second lower minor flap LMi2 (numbered for ease of reference but not shown).

The first and second minor side walls EW1 and EW2 are integrally connected to opposing side edges, respectfully, of the first major side wall SW1 and are separated from the first major side wall SW1 via vertical fold lines (such as creases or scores) F1 and F2, respectively. The first and second minor side walls EW1 and EW2 are also integrally connected to opposing side edges, respectfully, of the second major side wall SW2 and are separated from the second major side wall SW2 via vertical fold lines F3 and F4, respectively. Accordingly, the first and second minor side walls EW1 and EW2 and the first and second major side walls SW1 and SW2 are all integrally connected.

The first upper and lower major flaps UMa1 and LMa1 are integrally connected to the upper and lower edges, respectfully, of the first major side wall SW1 and separated from the first major side wall SW1 via horizontal fold lines F5 and F6, respectively. The second upper and lower major flaps UMa2 and LMa2 are integrally connected to the upper and lower edges, respectfully, of the second major side wall SW2 and separated from the second major side wall SW2 via horizontal fold lines F7 and F8, respectively. The first upper and lower minor flaps UMi1 and LMi1 are integrally connected to the upper and lower edges, respectfully, of the first minor side wall EW1 and separated from the first minor side wall EW1 via horizontal fold lines F9 and F10 (numbered for ease of reference but not shown), respectively. The second upper and lower minor flaps UMi2 and LMi2 are integrally connected to the upper and lower edges, respectfully, of the second minor side wall EW2 and separated from the second minor side wall EW2 via horizontal fold lines F11 and F12, respectively.

FIG. 1 shows the case C in an open configuration in which the major and minor side walls are generally perpendicular to one another, the lower major and minor flaps are closed, and the upper major and minor flaps are open. More specifically, the lower minor flaps LMi1 and LMi2 are folded along the fold lines F10 and F12, respectively, such that they extend into the cavity formed by the major and minor side walls SW1, SW2, EW1, and EW2 and are generally perpendicular to the major and minor side walls, and the lower major flaps LMa1 and LMa2 are folded along the fold lines F6 and F8, respectively, such that they cover the lower minor flaps LMi1 and LMi2 and are generally perpendicular to the major and minor side walls. Since the upper major and minor flaps are open, the upper end of case C is open and ready to receive items (and if necessary, dunnage) before the upper major and minor flaps are closed (i.e., folded and taped shut).

To close the top of the case after product (and, if needed, dunnage) is loaded in the case C, first, the upper minor flaps UMi1 and UMi2 are folded inwardly (i.e., toward one another) along their respective fold lines F9 and F11 and then the upper major flaps UMa1 and UMa2 are folded inwardly (i.e., toward one another) along their respective fold lines F5 and F7. After being closed, the upper major flaps UMa1 and UMa2 are sealed via pressure-sensitive tape or another suitable mechanism.

SUMMARY

Various embodiments of the present disclosure provide a case-handling system including multiple flap-suppressing devices that can be vertically moved independently of one another to, when processing a relatively short case, enable the case-handling system to prepare for and receive the next case to-be-processed while the case-handling system is still folding the upper major flaps of the current case, which increases throughput.

Various embodiments of the present disclosure provide a case-handling system including a conveyor, a first flap-suppressing device vertically movable relative to the conveyor, a second flap-suppressing device vertically movable relative to the conveyor, wherein the first and second flap-suppressing devices are vertically movable independently of one another, and a controller operably connected to the conveyor to drive the conveyor, and operably connected to the first and second flap-suppressing devices to independently vertically move the first and second flap-suppressing devices. The controller is configured to, while the first flap-suppressing device is at a first flap-suppressing position and engaging closed upper minor flaps of a first case, cause the second flap-suppressing device to vertically move to a second flap-suppressing position different from the first flap-suppressing position in preparation for processing a second case.

Various embodiments of the present disclosure provide a method of operating a case-handling system, wherein the method includes: while causing, under control of a controller, a first flap-suppressing device at a first flap-suppressing position to engage closed upper minor flaps of a first case, causing, under control of the controller, a second flap-suppressing device to vertically move to a second flap-suppressing position different from the first flap-suppressing position in preparation for processing a second case.

DETAILED DESCRIPTION

Figure 1:
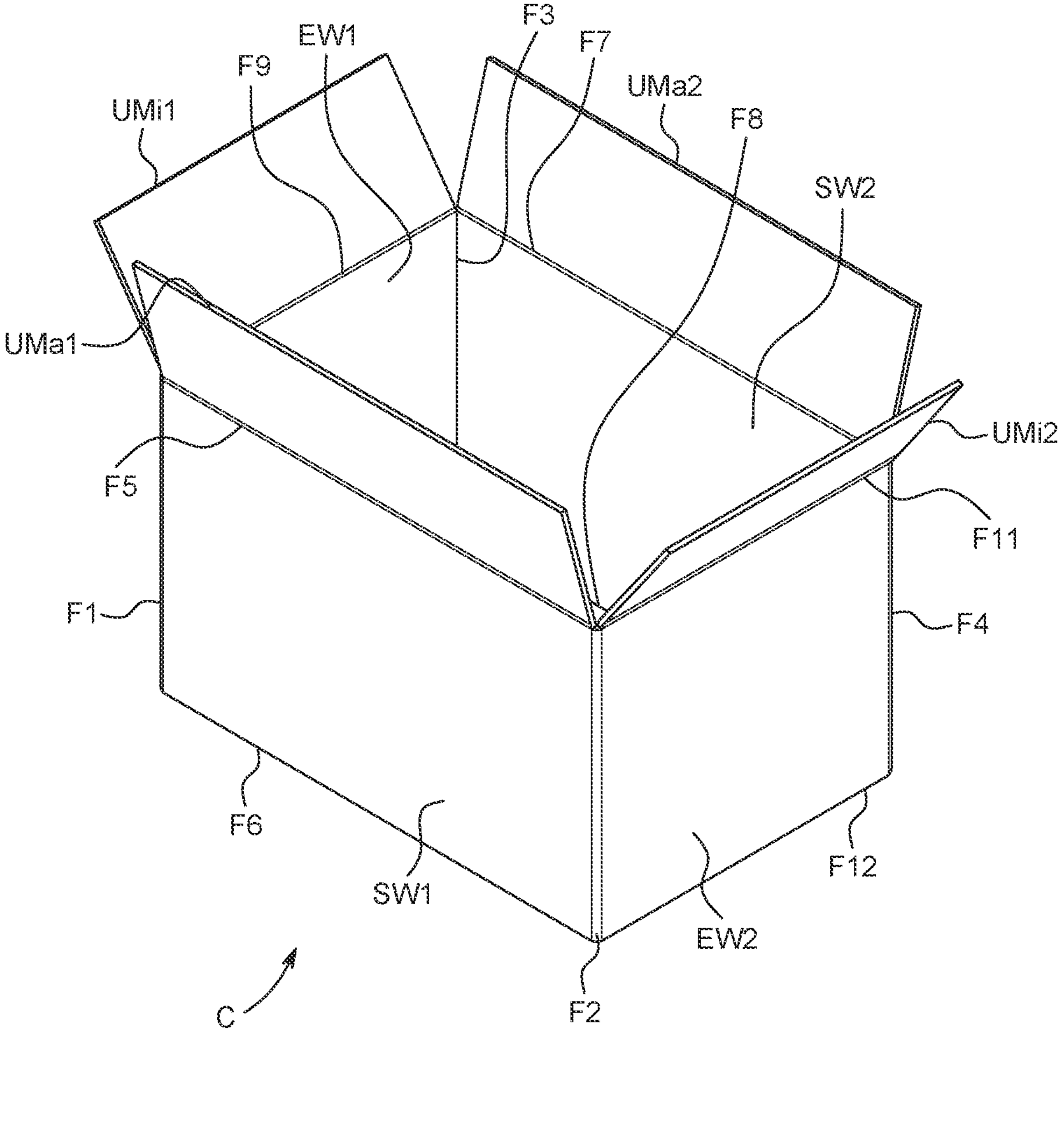
FIG. 1 is a top perspective view of a prior art case having open upper major and minor flaps and closed lower major and minor flaps.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

Various embodiments of the present disclosure provide a case-handling system including multiple flap-suppressing devices that can be vertically moved independently of and relative to one another and to cases processed by the case-handling system.). In situations in which the case being processed is relatively short, this configuration enables one or more of the upstream flap-suppressing devices to move to prepare for and receive the next case to-be-processed while the case-handling system is still folding the upper major flaps of the current case. Here, "downstream" means in the direction of travel from conveyor 140 to 180 described below, and "upstream" means the direction opposite to that direction of travel. This reduces the time needed to process successive cases of different sizes and increases throughput.

FIGS. 2-7F show one example embodiment of a case-handling system 120 of the present disclosure and components thereof. The case-handling system 120 includes an infeed conveyor 140, a central conveyor 160, an outfeed conveyor 180, a centering assembly 150, a minor-flap closer 200, a flap-suppression-and-closing system 300 including three independently moveable and operable suppressing-and-closing devices 400, 500, and 600, a case sealer 700 (numbered for ease of reference but not shown), a controller 900, and multiple sensors S.

The conveyors 140, 160, and 180 cooperate to move cases into, through, and out of the case-handling system 120. The infeed conveyor 140 is positioned upstream of the minor-flap closer 200, the flap-suppressing-and-closing system 300, and the case sealer 700. The outfeed conveyor 180 is positioned downstream of the minor-flap closer 200 and the flap-suppressing-and-closing system 300 and beneath the case sealer 700. The central conveyor 160 is positioned between the infeed and outfeed conveyors 140 and 180 and below the minor-flap closer 200 and the flap-suppressing-and-closing system 300. The infeed and outfeed conveyors 140 and 180 each include multiple rollers 142 and 182, respectively, that support the cases. The central conveyor 160 includes multiple parallel belts 162 and 164 that support the cases. The rollers 142 and 182 and the belts 162 and 164 are driven in tandem or independently by one or more drive assemblies (not shown) operated under the control of the controller 900. Two or all of the conveyors 140, 160, and 180 can be alternatively combined and not separate or independently operated from each other. The conveyors 140, 160, and 180 can also be alternatively positioned, oriented, sized, shaped, and otherwise configured. In certain alternative embodiments, the one or more conveyors can includes one or more hold down mechanism (such as one or more wheels) that provide downward pressure on each case.

The infeed conveyor 140 is operable to deliver each case to a case-centering position adjacent the centering assembly 150 and upstream of the minor-flap closer 200. The infeed conveyor 140 is operable to move each case from that position to the central conveyor 160. The central conveyor 160 moves each case below and through the minor-flap closer 200 and the flap-suppressing-and-closing system 300 and delivers each case to the outfeed conveyor 180, at which point the minor and major flaps of each case have been closed. The conveyor 180 moves each case below and through the case sealer 700, which seals the case, and away from the case-handling system 120.

The centering assembly 150 is positioned upstream of the minor-flap closer 200 and the flap-suppressing-and-closing system 300 and along the infeed conveyor 140 and is operable to center each case on the infeed conveyor 140. The centering assembly 150 includes first and second centering arms 152*a* and 152*b* (numbered for ease of reference but not shown) and a centering-arm actuator (not shown). The centering arms 152*a* and 152*b* are positioned on opposite sides of the infeed conveyor 140, extend generally parallel to a direction of travel of cases through the case-handling system 120, and are movable laterally inward (relative to the direction of travel) to laterally center each case on the infeed conveyor 140. The centering-arm actuator is operably connected to the first and second centering arms 152*a* and 152*b* (either directly or via suitable linkages) to move the centering arms 152*a* and 152*b* between: (1) a rest configuration in which the centering arms 152*a* and 152*b* are positioned at or near the lateral extents of the infeed conveyor 140 to enable a case to-be-sealed to be conveyed between the centering arms 152*a* and 152*b*; and (2) a centering configuration in which the centering arms 152*a* and 152*b* (after being moved toward one another) contact the case and center the case on the infeed conveyor 140. The controller 900 is operably connected to the centering-arm actuator to control the centering-arm actuator to move the centering arms 152_a_ and 152_b_ between the rest and centering configurations. The centering-arm actuator can be any suitable type of actuator, such as a motor or a pneumatic cylinder fed with pressurized gas and controlled by one or more valves. The centering assembly can be alternatively positioned, oriented, sized, shaped, and otherwise configured. Various embodiments may not include such a centering assembly or can include one or more guides or other mechanisms that center each case.

The minor-flap closer 200 is operable to close the upper minor flaps of each case. The minor-flap closer 200 includes a support 210, a stationary leading-minor-flap closer 220 connected to the support 210, a movable trailing-minor-flap closer 240 pivotally connected to the support 210, and a trailing-minor-flap-closer actuator (not shown) operably connected to the trailing-minor-flap closer 240 and configured to pivot the trailing-minor-flap closer 240. The stationary leading-minor-flap closer 220 extends downward from an underside of the support 210 and is positioned, shaped, oriented, and otherwise configured to engage the leading surface of the first upper minor flap UMi1 of each case C as the central conveyor 160 moves that case C into contact with the stationary leading-minor-flap closer 220. Continued movement of that case C past the stationary leading-minor-flap closer 220 results in the first upper minor flap UMi1 closing. The trailing-minor-flap-closer actuator is configured to pivot the trailing-minor-flap-closer 240 downwardly (under control of the controller 900) to engage and close the second upper minor flap UMi2 of that case C as the case C moves under the minor-flap closer 200. The trailing-minor-flap-closer actuator can be any suitable type of actuator, such as a motor or a pneumatic cylinder fed with pressurized gas and controlled by one or more valves. Although not shown, a minor-flap-closer actuator is operably connected to the minor-flap closer 200 (such as to the support 210) and configured to vertically move the minor-flap closer 200 (under control by the controller 900) to a suitable height based on the height of each case, which is determined by one or more of the sensors S in certain embodiments.

The flap-suppressing-and-closing system 300 is operable to maintain the upper minor flaps of each case that have been closed by the minor-flap closer 200 in their respective closed positions and to close the upper major flaps of each case before the case sealer 700 applies tape to the closed upper major flaps. The flap-suppressing-and-closing system 300 includes first, second, and third independently movable and operable suppressing-and-closing devices 400, 500, and 600, although the quantity of suppressing-and-closing devices can vary. The first, second, and third suppressing-and-closing devices 400, 500, and 600 are identical in this example embodiment, and thus the first suppressing-and-closing device 400 is described in detail and the second and third suppressing-and-closing devices 500 and 600 are more generally described for brevity. Additionally, in FIG. 2, an example support 401 for the first suppressing-and-closing device 400 is shown, but the supports for the second and third suppressing-and-closing devices 500 and 600 are not shown for clarity. The suppressing-and-closing devices 400, 500, and 600 are referred to primarily referred to as the first, second, and third suppressing-and-closing devices herein, however, such indicators are not meant to limit the order of operation of such suppressing-and-closing devices 400, 500, and 600. For example, the suppressing-and-closing device 600 can engage a case first before the suppressing-and-closing device 500 engages a second case. In such example, the suppressing-and-closing device 600 functions as the first suppressing-and-closing device and the suppressing-and-closing device 500 functions as the second suppressing-and-closing device.

As best shown in FIGS. 4A, 4B, 5A, and 5B, the first suppressing-and-closing device 400 includes a carriage 410 supported by and vertically movable relative to spaced-apart supports 401 and 402 (numbered for ease of reference but not shown). The carriage 410 is connected to the supports 401 and 402 (numbered for ease of reference but not shown) by connectors 403 and 404 (numbered for ease of reference but not shown). A carriage actuator (not shown) is operably connected to the carriage 410 and configured to move the carriage 410 (under control by the controller 900) vertically along the supports 401 and 402 such that the first suppressing-and-closing device 400 can be moved to different heights to enable it to suppress and close the upper flaps of cases having different heights. The carriage actuator can be any suitable type of actuator, such as a motor or a pneumatic cylinder fed with pressurized gas and controlled by one or more valves.

The first suppressing-and-closing device 400 includes a minor-flap suppressor 415 connected to and extending downwardly from the carriage 410 (and thus vertically moveable with the carriage 410). The minor-flap suppressor 415 includes spaced apart downwardly extending supports 420 and 422 and a minor-flap engager 430. The top ends of the supports 420 and 422 are connected to the carriage 410 and the bottom ends of the supports 420 and 422 are connected to the minor-flap engager 430. The minor-flap engager 430 includes a longitudinally upwardly extending angled forward section 432 and a longitudinally extending, flat, horizontal rearward section 434 extending rearwardly (i.e., downstream of) the forward section 432. The forward section 432 and the rearward section 434 of the minor-flap engager 430 extend generally parallel to a direction of travel of cases through the case-handling system 120. The forward section 432 and the rearward section 434 are positioned, sized, shaped, oriented, and otherwise configured to engage the top surfaces of the closed upper minor flaps of a case as the case in moved under the first suppressing-and-closing device 400 to suppress such closed minor flaps and prevent them from opening.

The first suppressing-and-closing device 400 includes first and second major-flap closers 450 and 470 pivotally connected to opposite sides of the carriage 410 and positioned, sized, shaped, oriented, movable, and otherwise configured to engage and close the respective upper major flaps UMa1 and UMa2 of a case as further described below.

As best shown in FIGS. 4A, 4B, 5A, and 5B, the first flap closer 450 includes a rotatable first shoulder 452 connected to the carriage 410, a first upper arm 454 connected at its upper end to the rotatable first shoulder 452, a first elbow 460 connected to the lower end of the first upper arm 454, a first lower arm 464 connected at its upper end to the first elbow 460, a first flap-engaging hand 468 connected to the lower end of the first lower arm 464, and a first flap-closer actuator (not shown) connected to the first shoulder 452. The rotatable first shoulder 452, the first elbow 460, and the first flap-engaging hand 468 extend generally parallel to a direction of travel of cases through the case-handling system 120. The first shoulder 452 is rotatable by the first flap-closer actuator (under control of the controller 900) about a first rotational and longitudinal axis (not shown or labeled) and configured to rotate the first flap closer 450 from a retracted position shown in FIGS. 4A and 5A to a flap-engaging position shown in FIGS. 4B and 5B. Specifically, the first flap-closer actuator is operably connected to the first shoulder 452 to move the first upper arm 454, the first elbow 460, the first lower arm 464, and the first flap-engaging hand 468 downwardly and laterally inwardly (relative to the direction of travel of the case). The first flap-closer actuator can be any suitable type of actuator, such as a motor or pneumatic cylinder fed with pressurized gas and controlled by one or more valves. The controller 900 is operably connected to the first flap-closer actuator to control the first flap-closer actuator. In the retracted position (best shown in FIGS. 4A and 5A), the first flap closer 450 is above and out of the way of the any case and the upper major flaps of any case that is under or moves under the first suppressing-and-closing device 400. As the first flap closer 450 moves from the retracted position to the flap-engaging position, the first flap-engaging hand 468 engages the outer surface of the upper major flap and closes the upper major flap such that the upper major flap is adjacent to—and in certain embodiments contacts—the upper surface of the minor-flap engager 430. In this embodiment, the first upper arm 454 is pivotable about the first elbow 460 to the first lower arm 464 to facilitate closing of the upper major flap. In other embodiments, the first upper arm 454 is fixed relative to the first lower arm 464. In this embodiment, the flap-engaging hand 468 is rigid and inflexible, and can be formed from any suitable rigid material or component(s), such as metal or an inflexible polymeric rod. In other embodiments, the first flap-engaging hand is flexible. In such embodiments, the first flap-engaging hand can be formed from any suitable flexible material or component(s), such as foam or rubber.

Similarly, as also best shown in FIGS. 4A, 4B, 5A, and 5B, the second flap closer 470 includes a rotatable second shoulder 472 connected to the carriage 410, a second upper arm 474 connected at its upper end to the rotatable second shoulder 472, a second elbow 480 connected to the lower end of the second upper arm 474, a second lower arm 484 connected at its upper end to the second elbow 480, a second flap-engaging hand 488 connected to the lower end of the second lower arm 484, and a second flap-closer actuator (not shown) connected to the second shoulder 472. The rotatable second shoulder 472, the second elbow 480, and the second flap-engaging hand 488 extend generally parallel to a direction of travel of cases through the case-handling system 120. The second shoulder 472 is rotatable by the second flap-closer actuator (under control of the controller 900) about a second rotational and longitudinal axis (not shown or labeled) and configured to rotate the second flap closer 470 from a retracted position shown in FIGS. 4A and 5A to a flap-engaging position shown in FIGS. 4B and 5B. Specifically, the second flap-closer actuator is operably connected to the second shoulder 472 to move the second upper arm 474, the second elbow 480, the second lower arm 484, and the second flap-engaging hand 488 downwardly and laterally inwardly (relative to the direction of travel of the case). The second flap-closer actuator can be any suitable type of actuator, such as a motor or pneumatic cylinder fed with pressurized gas and controlled by one or more valves. The controller 900 is operably connected to the second flap-closer actuator to control the second flap-closer actuator. In the retracted position (best shown in FIGS. 4A and 5A), the second flap closer 470 is above and out of the way of the any case and the upper major flaps of any case that is under or moves under the first suppressing-and-closing device 400. As the second flap closer 470 moves from the retracted position to the flap-engaging position, the second flap-engaging hand 488 engages the outer surface of the upper major flap and closes the upper major flap such that the upper major flap is adjacent to—and in certain embodiments contacts—the upper surface of the minor-flap engager 430. In this embodiment, the second upper arm 474 is pivotable about the second elbow 480 to the second lower arm 484 to facilitate closing of the upper major flap. In other embodiments, the second upper arm 474 is fixed relative to the second lower arm 484. In this embodiment, the second flap-engaging hand 488 is rigid and inflexible, and can be formed from any suitable rigid material or component(s), such as metal or an inflexible polymeric rod. In other embodiments, the second flap-engaging hand is flexible. In such embodiments, the second flap-engaging hand can be formed from any suitable flexible material or component(s), such as foam or rubber.

The controller 900 is operably connected to the first flap-closer actuator and the second flap-closer actuator to simultaneously control these actuators and the first and second flap closers 450 and 470. The controller 900 can alternatively sequentially or independently control these actuators and the first and second flap closers 450 and 470.

As shown in FIGS. 6A-7F, the second suppressing-and-closing device 500 includes a movable carriage 510, a minor-flap suppressor 515 connected to the movable carriage 510, flap closers 550 and 570 pivotally connected to the movable carriage 510, and suitable actuators (not shown), and the third suppressing-and-closing device 600 includes a movable carriage 610, a minor-flap suppressor 615 connected to the movable carriage 610, flap closers 650 and 670 pivotally connected to the movable carriage 610, and suitable actuators (not shown). The controller 900 is operably connected to each of the carriage actuators to control each of the carriage actuators independently of one another to independently raise or lower the individual suppressing-and-closing devices. As described in more detail below, in operation, the controller 900 controls the respective carriage actuators to move each of the suppressing-and-closing devices 400, 500, and 600 (and the respective flap suppressors and flap closers thereof) to different heights to suppress and close the upper flaps of cases of different sizes, as shown FIGS. 6A-7F and described in detail below.

The case sealer 700 includes a tape applicator (not shown) that includes a tape cartridge (not shown) supporting a roll of tape (not shown). The tape applicator is configured to apply tape from the roll to the closed upper major flaps UMa1 and UMa2 and minor side walls of the case as the outfeed conveyor 180 moves the case C beneath and past the tape cartridge. The case sealer 700 can be downstream of the flap-suppressing-and-closing system or can be integrated into the flap-suppressing-and-closing system 300 or the suppressing-and-closing devices 400, 500, and 600. This embodiment includes a single case sealer 700. Other embodiments can include multiple case sealers such as a separate case sealer associated or connected to each of the suppressing-and-closing devices 400, 500, and 600.

The controller 900 controls, communicates with, and operates with the components of the case-handling system 120, including various actuators, drive assemblies, and sensors referenced above. The controller 900 is operably connected to and configured to control each of the actuators described herein. The controller 900 is thus configured to control movement and operation of the conveyors 140, 160, and 180, the centering assembly 150, the minor-flap closer 200, the flap-suppressing-and-closing system 300 including the suppressing-and-closing devices 400, 500, and 600, and the case sealer 700. The controller 900 can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random-access memory, read-only memory, or flash memory). The memory device(s) stores instructions executable by the processing device(s) to control operation of the case-handling system 120.

Generally, in operation, the case-handling system 120 sequentially receives cases that are filled with product (and in some instances, dunnage) and that have their upper major and minor flaps open. The case-handling system 120 is configured, for each case, to: (1) center the case via the centering assembly 150; (2) close the upper minor flaps via the minor-flap closer 200; (3) suppress the upper minor flaps while closing the upper major flaps via the flap-suppressing-and-closing system 300; and (4) apply tape to the closed upper major flaps via the case sealer 700 to seal the case shut in preparation for shipping.

Figure 2:
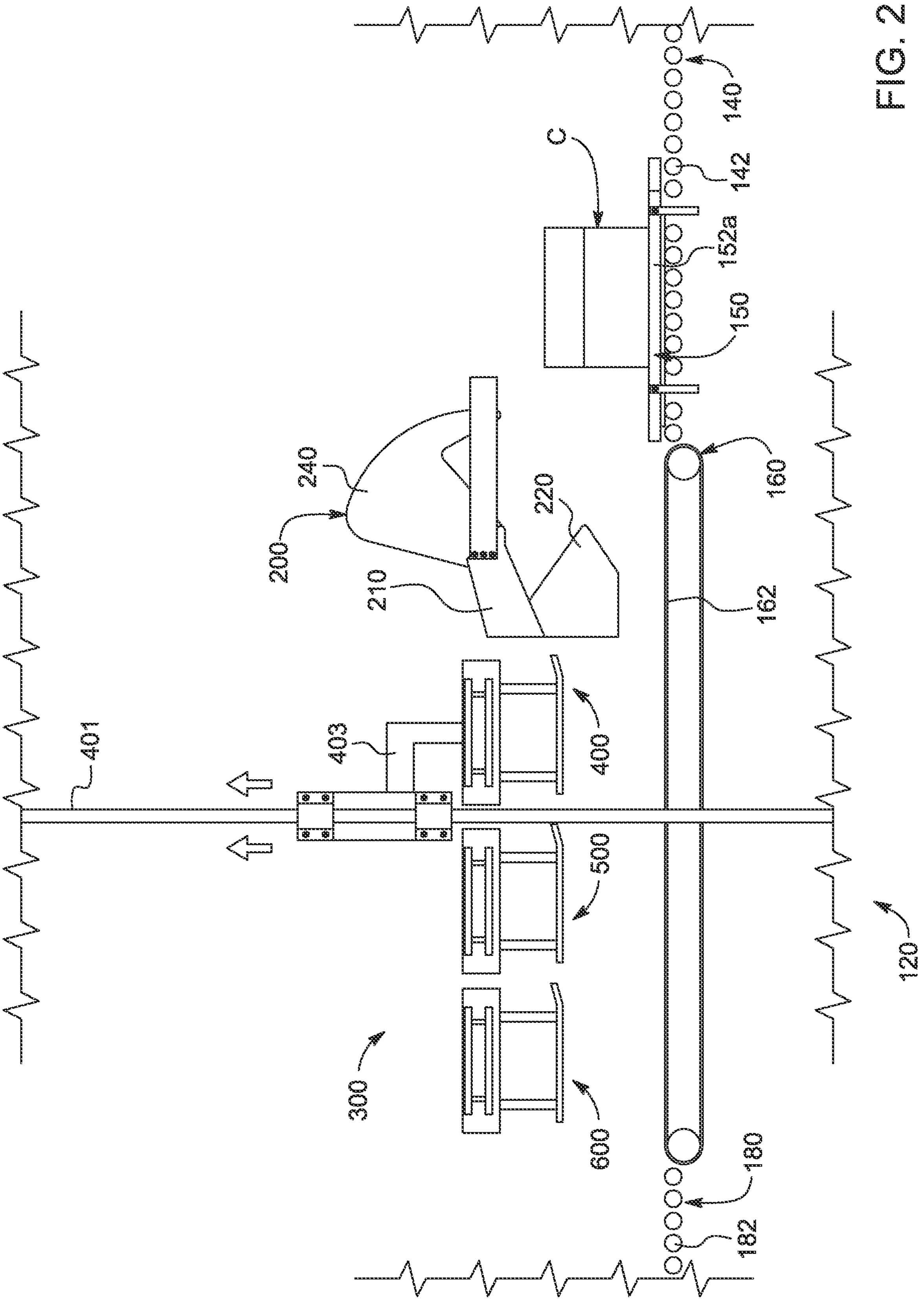
FIG. 2 is a side view of part of an example case-handling system of the present disclosure including a flap-suppressing-and-closing system including major-flap closer with three independently movable and operable suppressing-and-closing devices.
Figure 3:
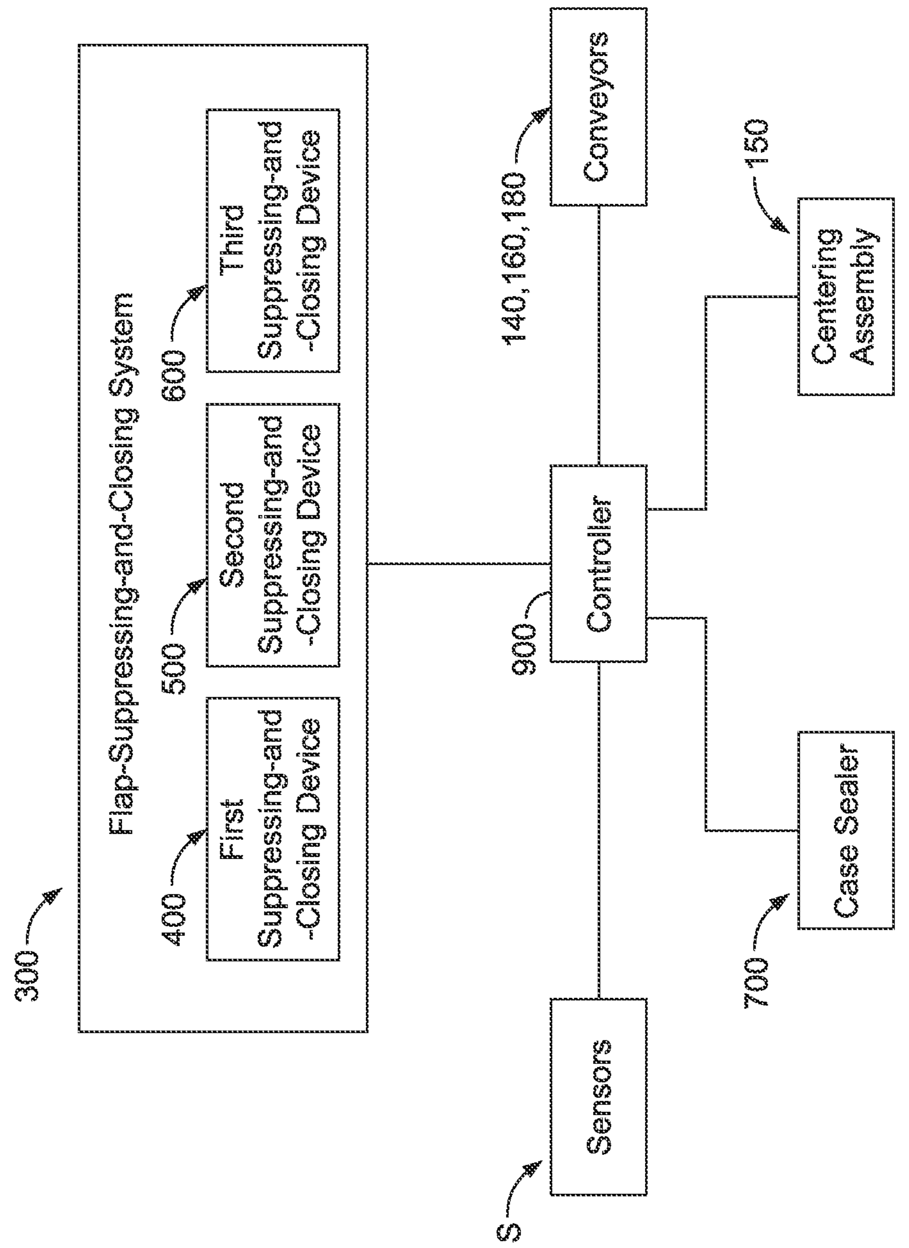
FIG. 3 is a block diagram showing certain components of the case-handling system of FIG. 2.
Figure 4A:
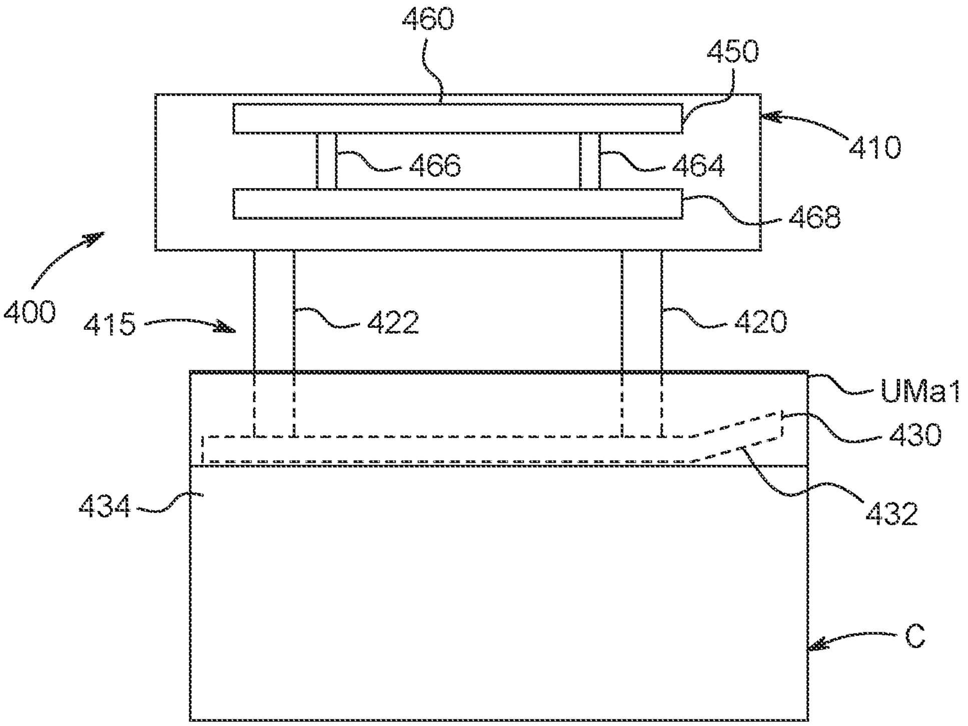
FIGS. 4A and 5A are side and front views, respectively, of the first suppressing-and-closing device of the case-handling system of FIG. 2 with its minor-flap suppressor in a minor-flap-engagement position and its major-flap closers in retracted positions.
Figure 4B:
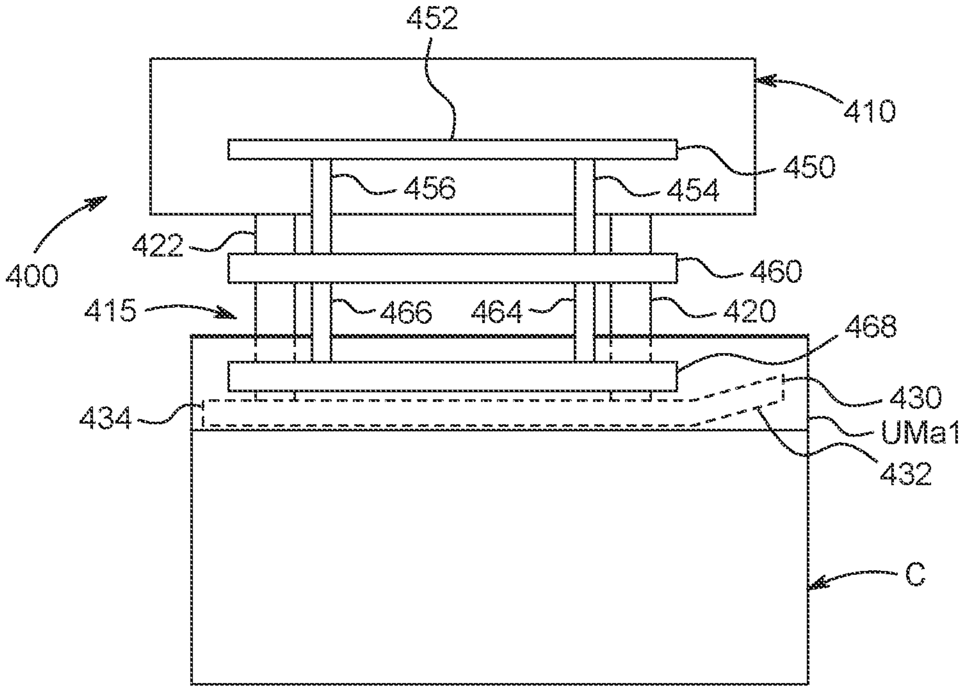
FIGS. 4B and 5B are side and front views, respectively, of the first suppressing-and-closing device of FIGS. 4A and 5A with its minor-flap suppressor in the minor-flap-engagement position and its major-flap closers in major-flap-engagement positions.
Figure 5A:
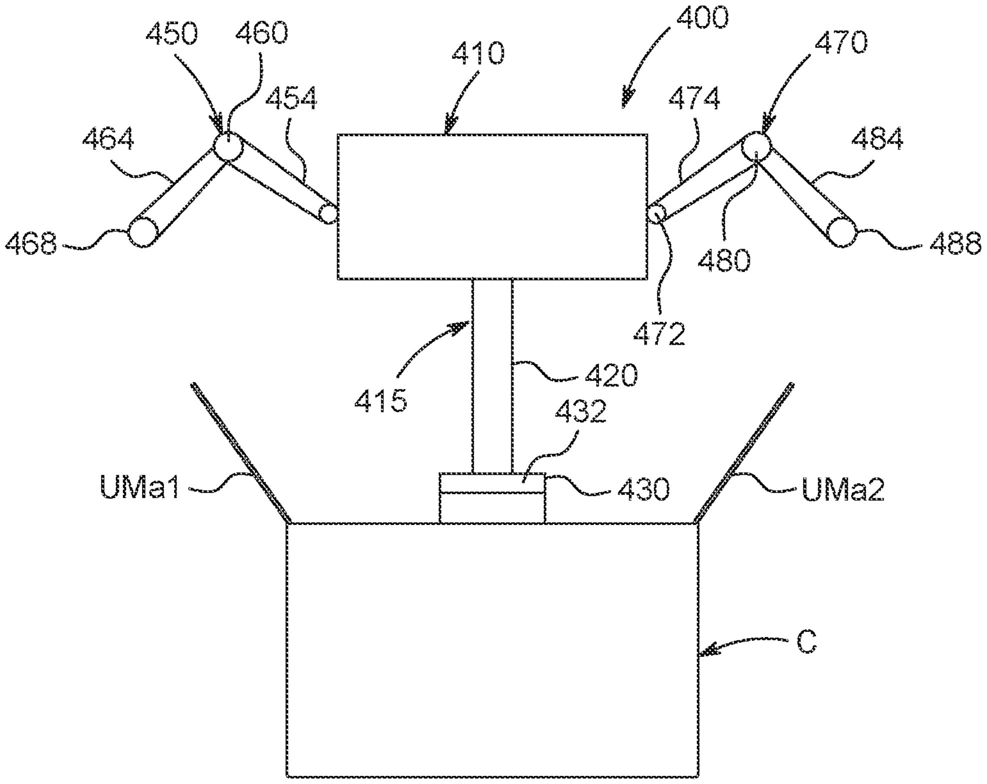
Figure 5B:
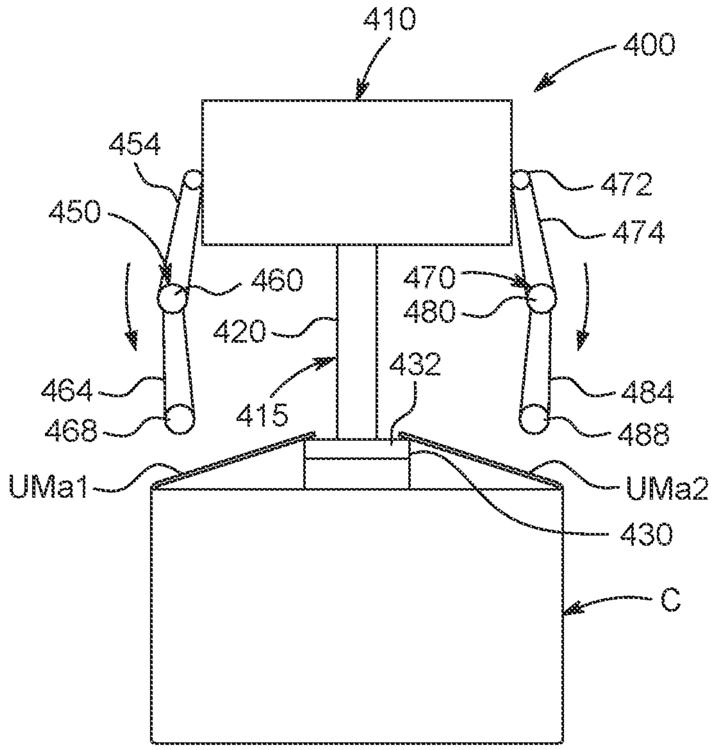

More specifically, the controller 900 first controls the infeed conveyor 140 to move a case C toward the minor-flap closer 200. The case C triggers one of the sensors S (which is a photocell in this example embodiment) when it reaches a position between the centering arms 152*a* and 152*b* of the centering assembly 150, as shown in FIG. 2. This causes the controller 900 to: stop the infeed conveyor 140 and move the centering arms 152*a* and 152*b* laterally inwardly to center the case C on the infeed conveyor 140. After the centering arms 152*a* and 152*b* center the case C, the controller 900 controls the infeed conveyor 140 to continue moving the case C toward the minor-flap folder 200.

While the case C is at least partially on the infeed conveyor 140, the controller 900 determines a minor-flap-closing position based on the size (such as the height and width) of the case C and controls the minor-flap closer 200 to vertically move (if necessary) to that minor-flap folding position in preparation for folding the upper minor flaps of the case C. In other words, the controller 900 vertically positions the minor-flap closer 200 such that the minor-flap folder will properly close the upper minor flaps of the particular case C that the case-handling system 120 is processing. The controller 900 may determine the size of the case C in any suitable manner, such as based on feedback from one or more of the sensors S or from an input received from an operator or another component of the packaging line. In various embodiments, the controller 900 receives the minor-flap-closing position from another component of the packaging line. The controller 900 further controls the central conveyor 160 to move the case C into contact with the leading-minor-flap closer 220. Continued movement of the case C causes the leading-minor-flap closer 220 to close the leading upper minor flap Until of the case C, and the controller 900 then controls trailing-minor-flap closer 240 to pivot to engage and close the trailing upper minor flap UMi2 of the case C.

Before the case C reaches the flap-suppressing-and-closing system 300 (and specifically the suppressing-and-closing devices 400, 500, and 600), the controller 900 determines flap-suppressing-and-folding positions for each suppressing-and-closing device based on the size (such as the height and width) of the case C and controls each suppressing-and-closing device to vertically move to its respective flap-suppressing-and-closing position in preparation for holding the upper minor flaps of the case C in their closed positions and folding the upper major flaps of the case C. The controller 900 may determine the size of the case C in any suitable manner, such as based on feedback from one or more of the sensors S or from an input received from an operator or another component of the packaging line. In other embodiments, the controller 900 receives the flap-suppressing-and-closing positions from another component of the packaging line. In this example embodiment, the flap-suppressing-and-folding positions of the suppressing-and-closing devices are the same. Because the suppressing-and-closing devices 400, 500, and 600 are independently movable, the controller 900 can control each flap-suppressing-and-closing device to vertically move to its respective flap-suppressing-and-closing position as soon as the case currently being processed moves out from beneath that particular suppressing-and-closing device, as described below in conjunction with FIGS. 6A-7F. As explained below, this independent control and movement of the suppressing-and-closing devices 400, 500, and 600 enables the controller C to begin repositioning upstream one or more of the independent suppressing-and-closing devices for receiving the next case while downstream one or more of the other suppressing-and-closing devices are still suppressing and closing the flaps of the current case.

The controller 900 further controls the central conveyor 160 to move the case C into contact with and beneath the suppressing-and-closing devices 400, 500, and 600. As described above (and below), the suppressing-and-closing devices 400, 500, and 600 engage the upper minor flaps of the case C and hold them closed while also closing the upper major flaps of the case C. The controller 900 controls the outfeed conveyor 180 to move the case C beneath the case sealer 700, which seals the case C, and then away from the case-handling system 120.

FIGS. 6A-6F and FIGS. 7A-7F are side and top views, respectively, showing the flap-suppressing-and-closing system 300 (and specifically the suppressing-and-closing devices 400, 500, and 600) processing three cases of different sizes. First case C1 has a first height and a first length. Second case C2 has a second height greater than the first height and a second length longer than the first length. Third case C3 has a third height greater than the second height and a third length longer than the second length.

Figure 6A:
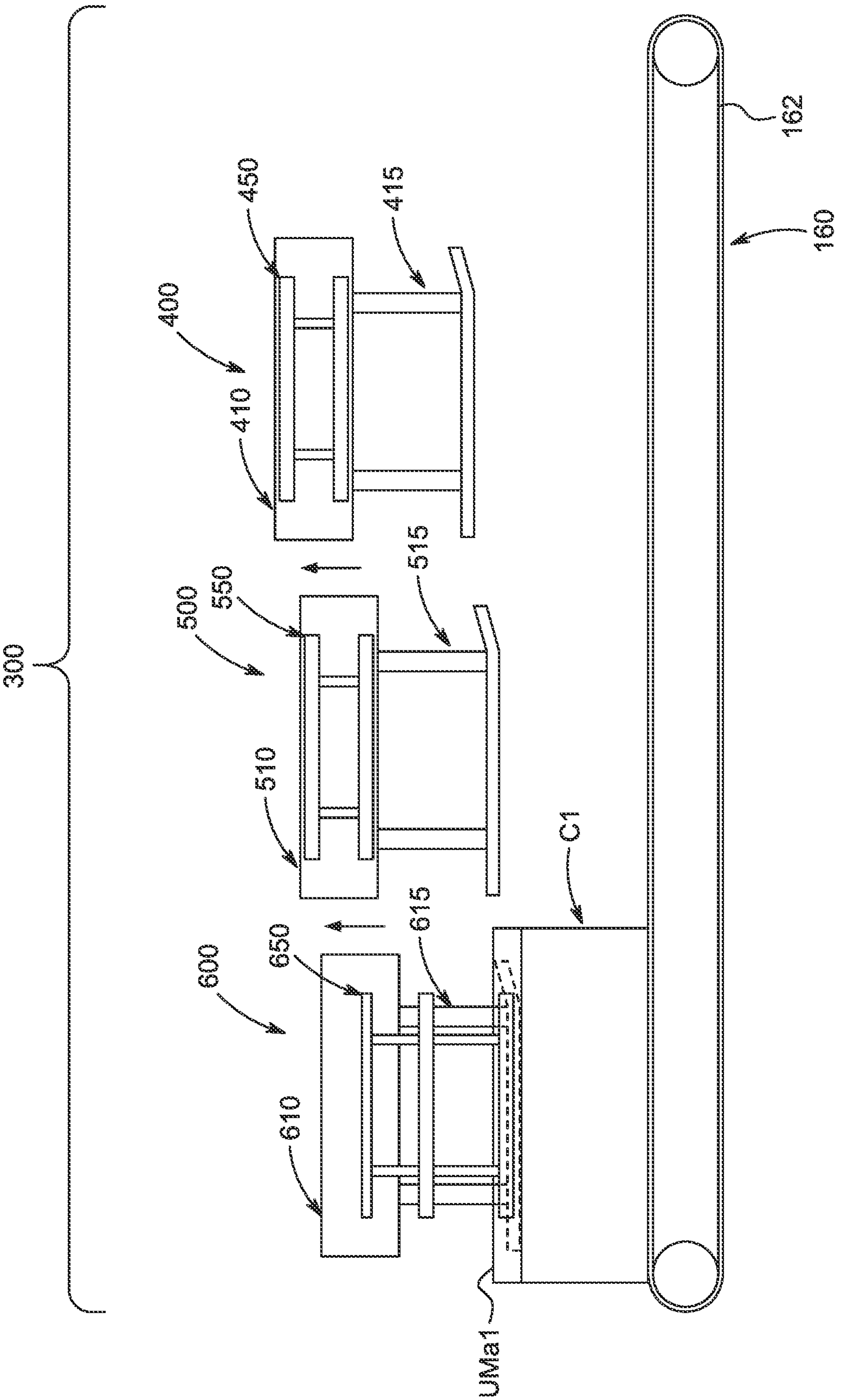
FIGS. 6A-6F are side views of the suppressing-and-closing devices of the case-handling system of FIG. 2 suppressing the upper minor flaps of and closing the upper major flaps of three cases of differing heights and lengths.
Figure 7A:
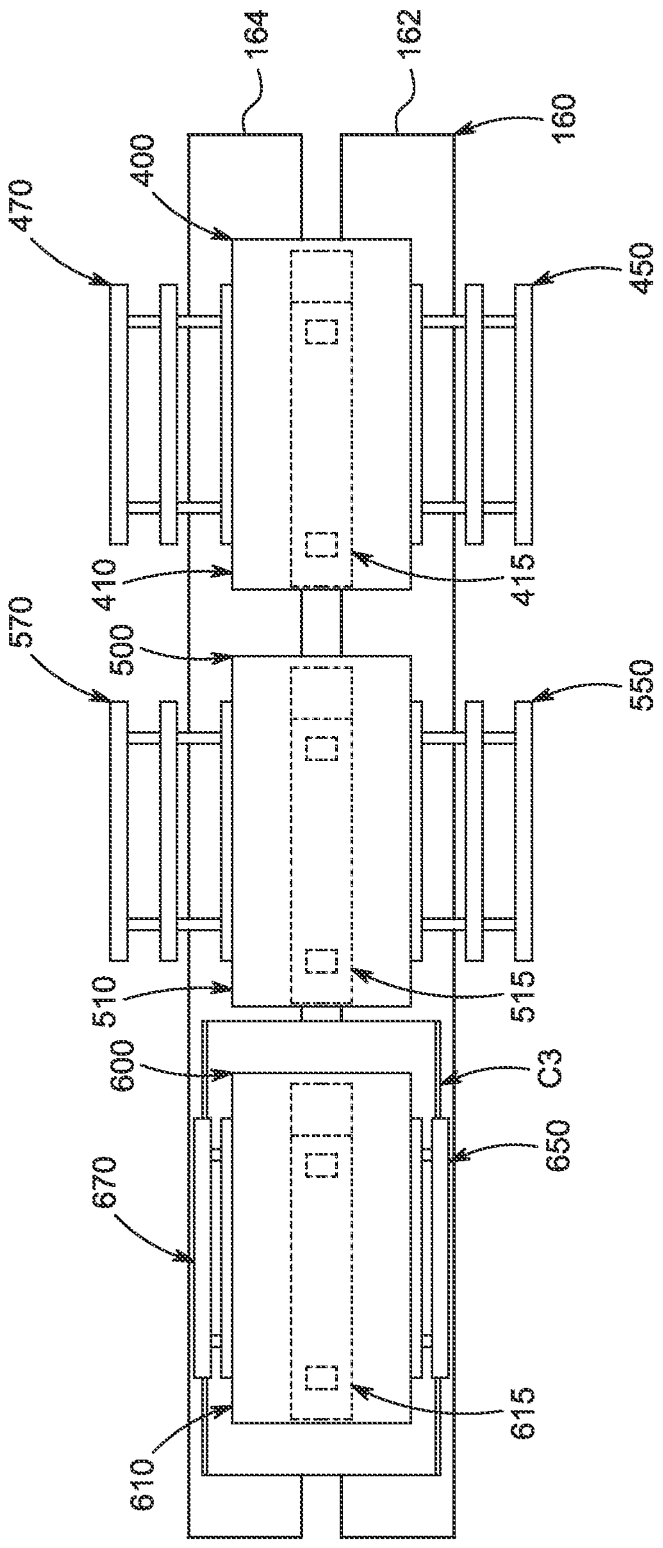
FIGS. 7A-7F are top views corresponding to FIGS. 6A-6F.

FIGS. 6A and 7A show the flap-suppressing-and-closing system 300 after the first case C1 has moved beneath and past the first and second suppressing-and-closing devices 400 and 500 and is beneath the third suppressing-and-closing device 600. At this point, the minor-flap suppressor 615 of the third suppressing-and-closing device 600 suppresses the upper minor flaps of the first case C1, and with the major-flap closers 650 and 670 of the third suppressing-and-closing device 600 have moved to their flap-engaging positions to close the upper major flaps of the first case C1. Since the first case C1 is relatively short lengthwise, only the third suppressing-and-closing device 600 is used to close the upper major flaps of the first case C1. This enables the first and second suppressing-and-closing device 400 and 500 to begin moving to their flap-suppressing-and-closing positions in preparation for the next case—here, the second case C2—after the first case C1 moves past the first and second suppressing-and-closing device 400 and 500 and (at least in this example embodiment) while the third suppressing-and-closing device 600 engages and folds the flaps of the first case C1.

Figure 6B:
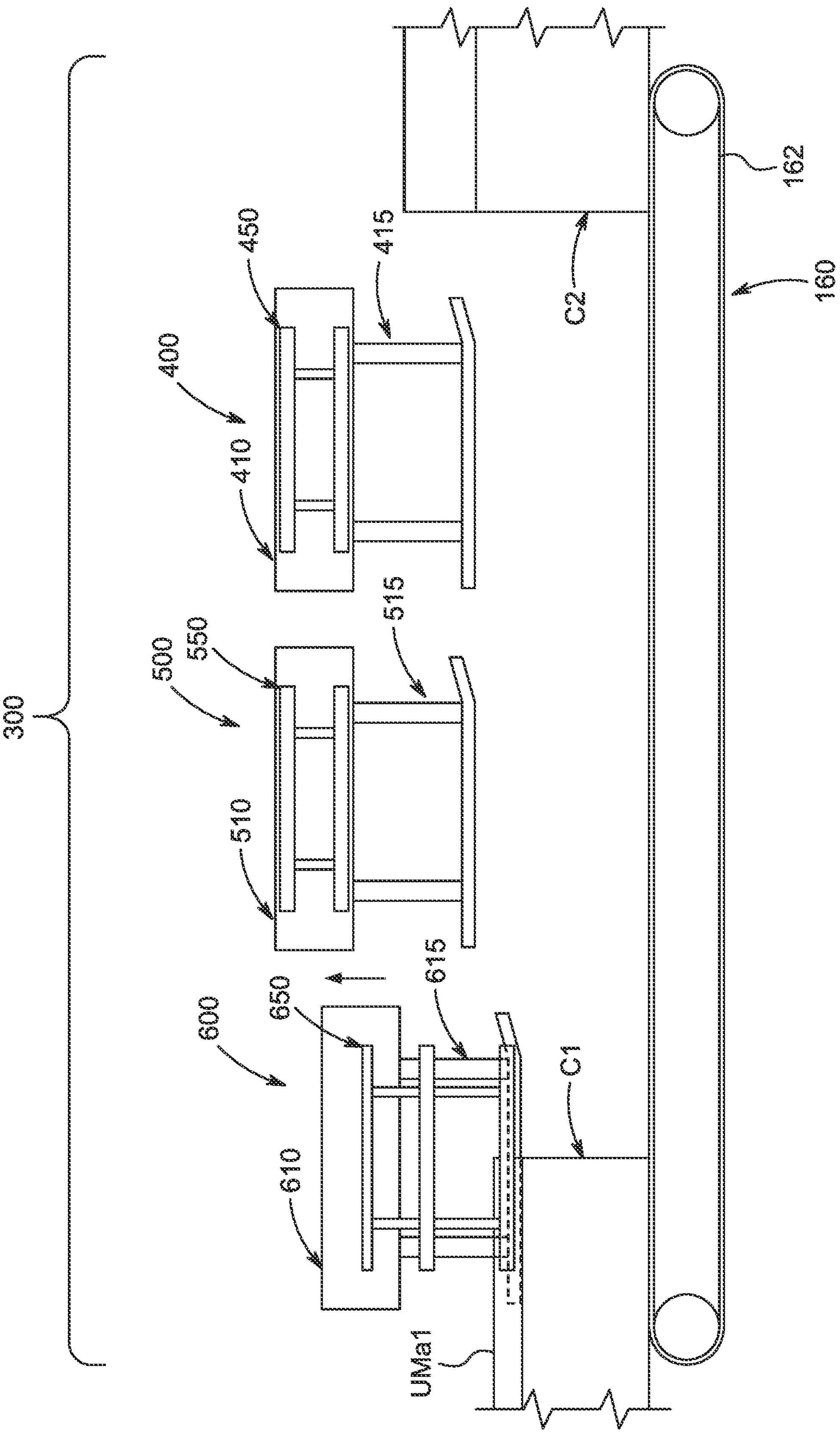
Figure 7B:
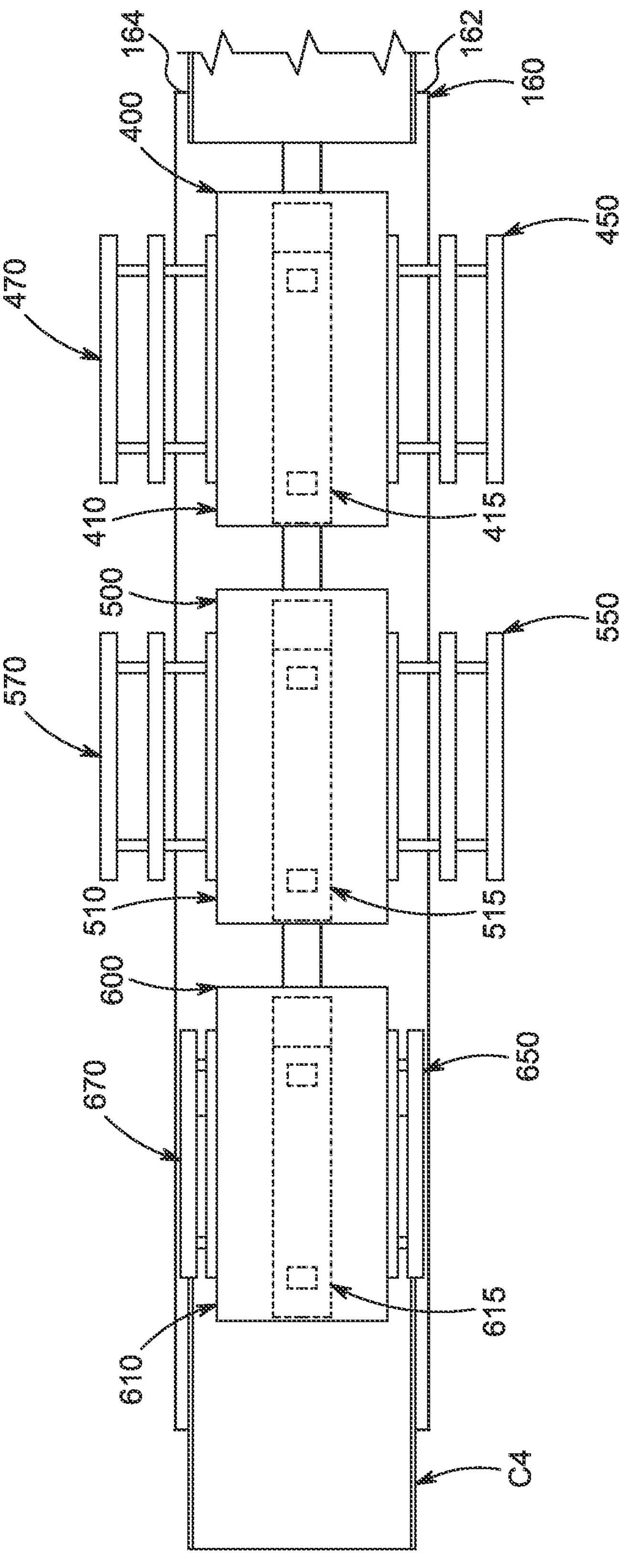

FIGS. 6B and 7B show the flap-suppressing-and-closing system 300 after the first case C1 has moved slightly downstream but is still engaged by and partially beneath the third suppressing-and-closing device 600. The first and second suppressing-and-closing devices 400 and 500 have reached their respective flap-suppressing-and-closing positions for the second case C2, and the second case C2 is on the central conveyor 160 and about to reach the first suppressing-and-closing device 400.

Figure 6C:
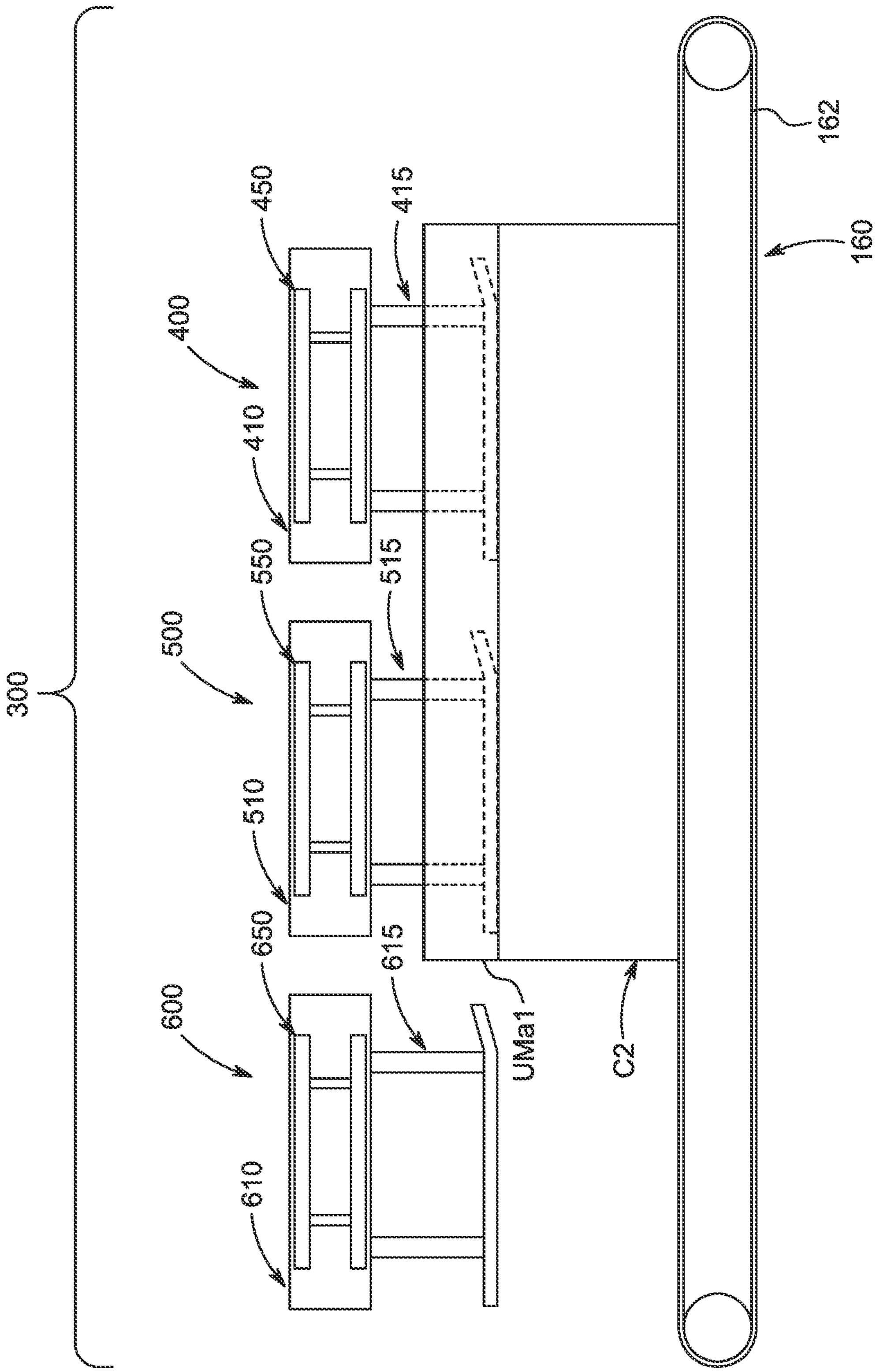
Figure 7C:
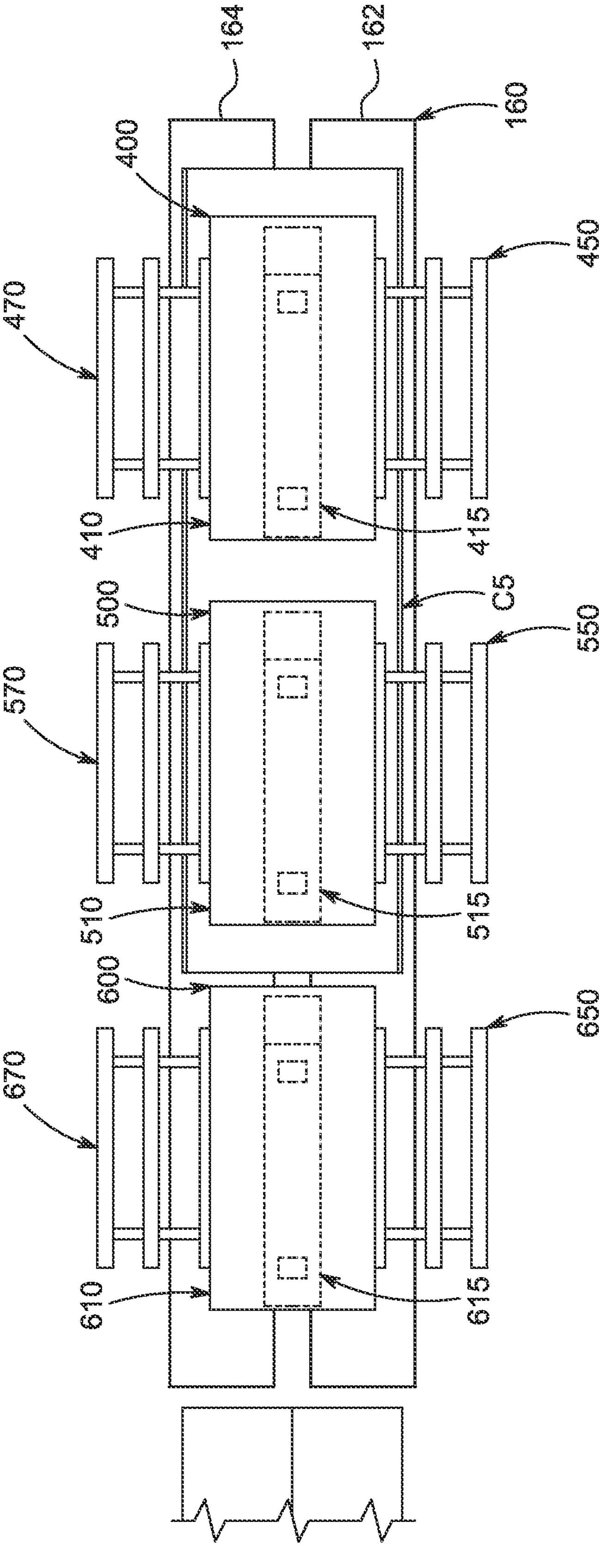

FIGS. 6C and 7C show the flap-suppressing-and-closing system 300 after the first case C1 has moved out from beneath the third suppressing-and-closing device 600, after the second case C2 has moved downstream and is beneath and engaged by the first and second suppressing-and-closing devices 400 and 500 (which are suppressing the upper minor flaps of the second case C2), and after the third suppressing-and-closing device 600 has moved upward to its flap-suppressing-and-closing position for the second case C2. In other words, in this example scenario and due to the independently movable configuration of the suppressing-and-closing devices, the flap-suppressing-and-closing system 300 was able to begin processing the second case C2 (via engagement with the first suppressing-and-closing device 400) while completing its processing of the first case C1 (via engagement with the third suppressing-and-closing device 600). This increases throughput as compared to prior art case-handling systems that have a single flap-suppressing-and-closing system. These prior art case-handling systems must wait to completely process each case with the single flap-suppressing-and-holding system before readjusting its height to process the next case. On the other hand, the flap-suppressing-and-closing system 300 of the present disclosure can engage two cases having two different heights at the same time, which minimizes the latency between boxes. In other words, cases can be processed closer together than known systems running at the same linear speed.

Figure 6D:
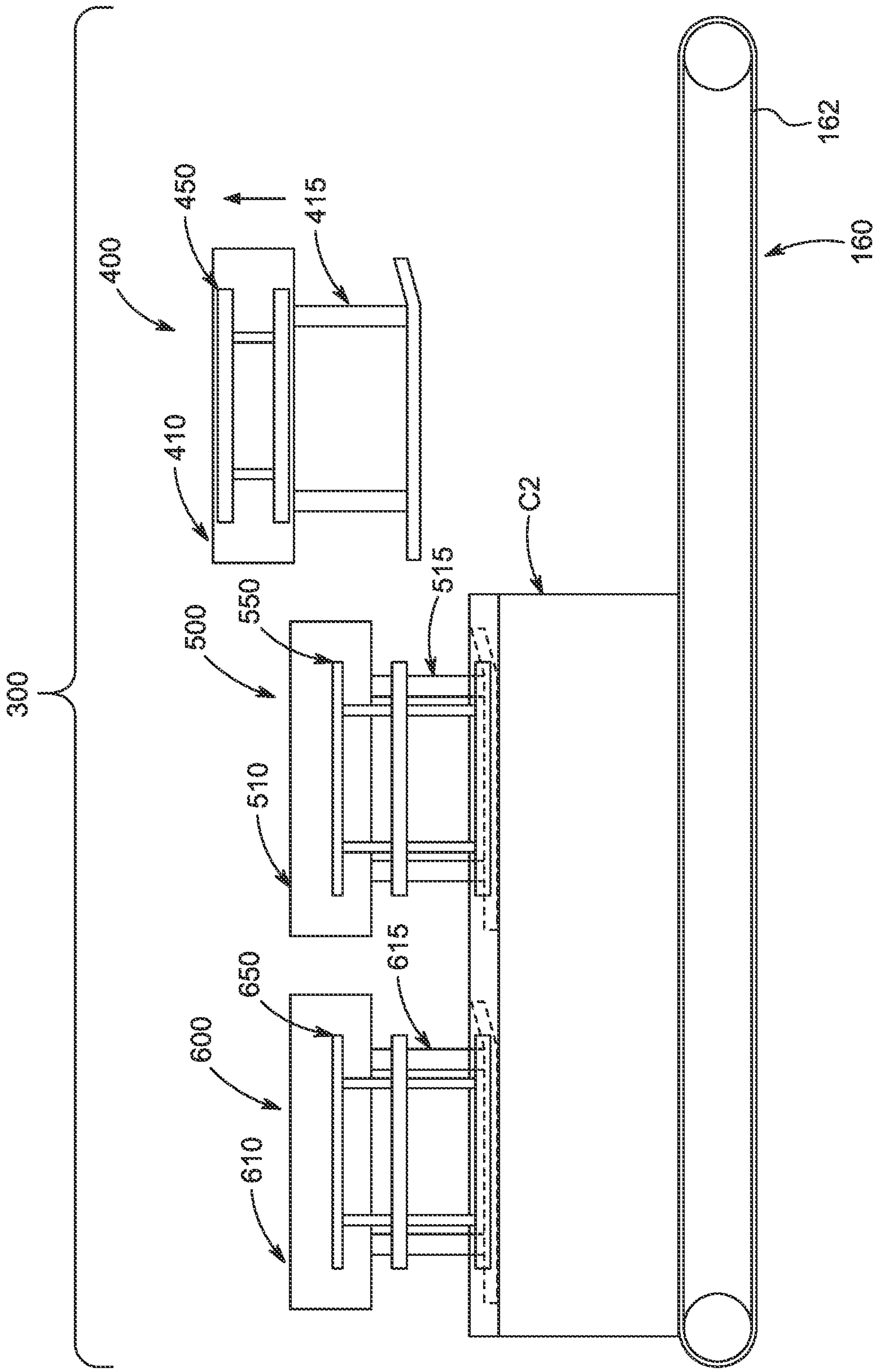
Figure 7D:
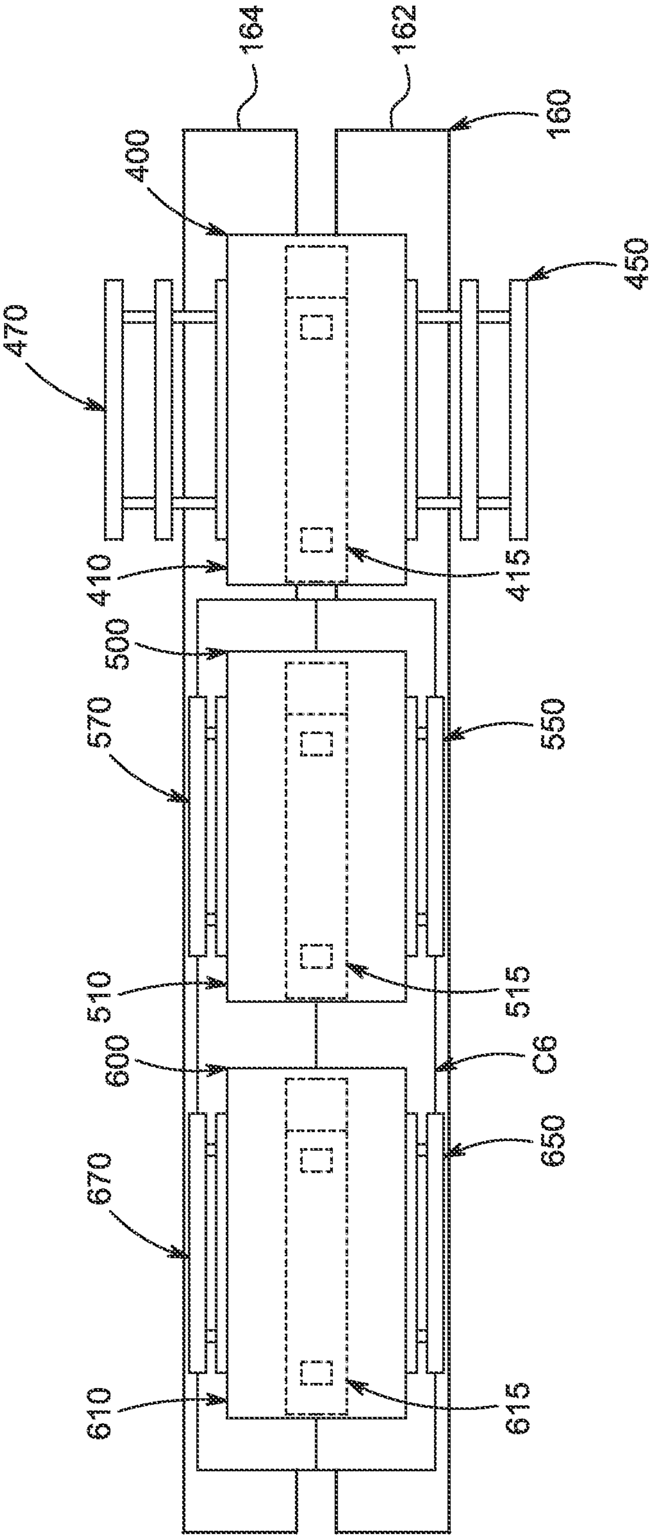

FIGS. 6D and 7D show the flap-suppressing-and-closing system 300 after the second case C2 has moved beneath and past the first suppressing-and-closing device 400 and is beneath the second and third suppressing-and-closing devices 500 and 600. At this point, the minor-flap suppressors 515 and 615 of the second and third suppressing-and-closing devices 500 and 600 suppress the upper minor flaps of the second case C2, and the major-flap closers 550 and 570 and 650 and 670 of the second and third suppressing-and-closing devices 500 and 600 have moved to their flap-engaging positions to close the upper major flaps of the second case C2. Since the second case C2 is short enough lengthwise so as not to extend beneath all three suppressing-and-closing devices, only the second and third suppressing-and-closing devices 500 and 600 are used to close the upper major flaps of the second case C2. This enables the first suppressing-and-closing device 400 to begin moving to its flap-suppressing-and-closing position in preparation for the next case—here, the third case C3—after the second case C2 moves past the first suppressing-and-closing device 400 and (at least in this example embodiment) while the second and third suppressing-and-closing devices 500 and 600 engage and fold the flaps of the second case C2.

Figure 6E:
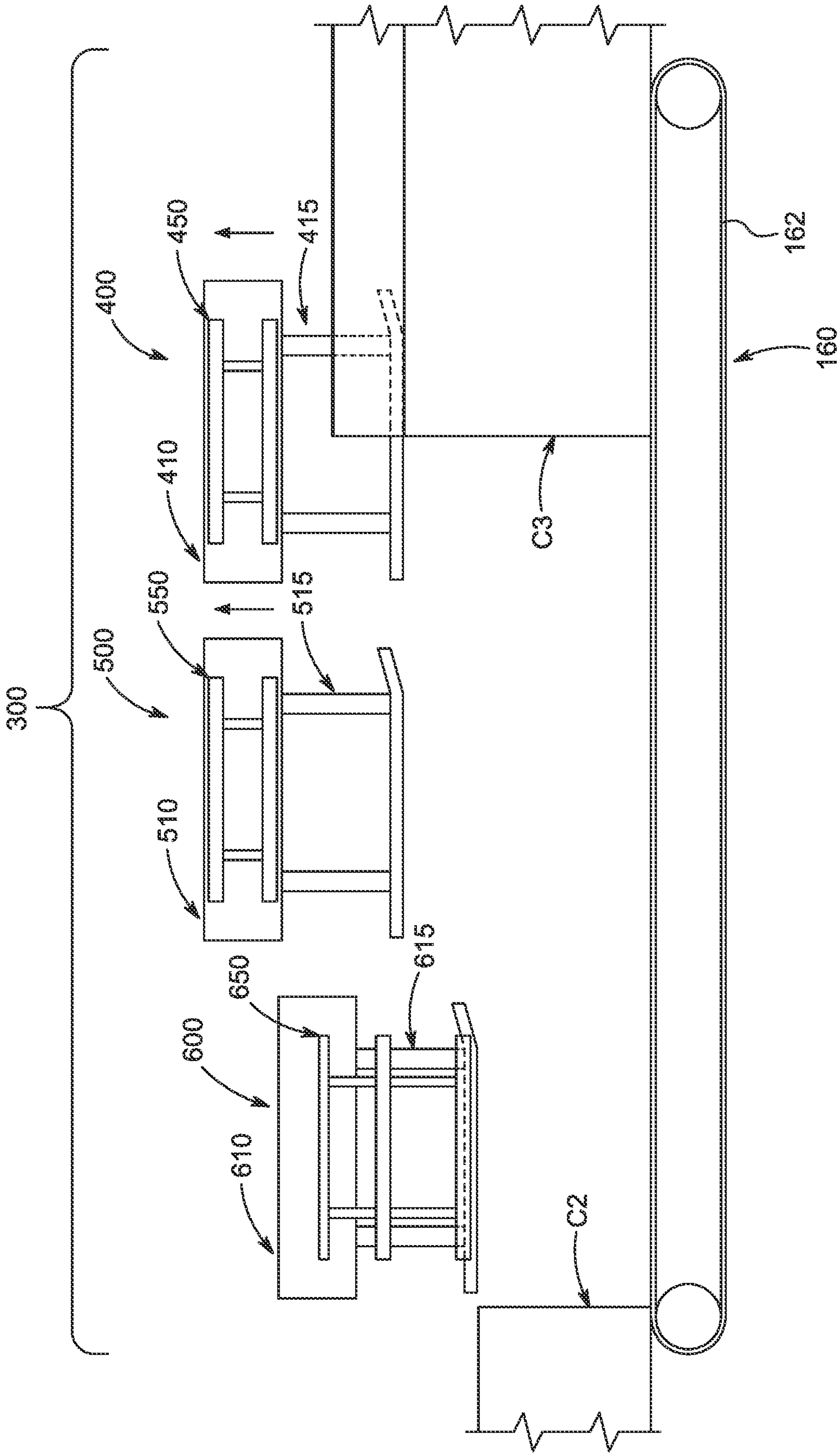
Figure 7E:
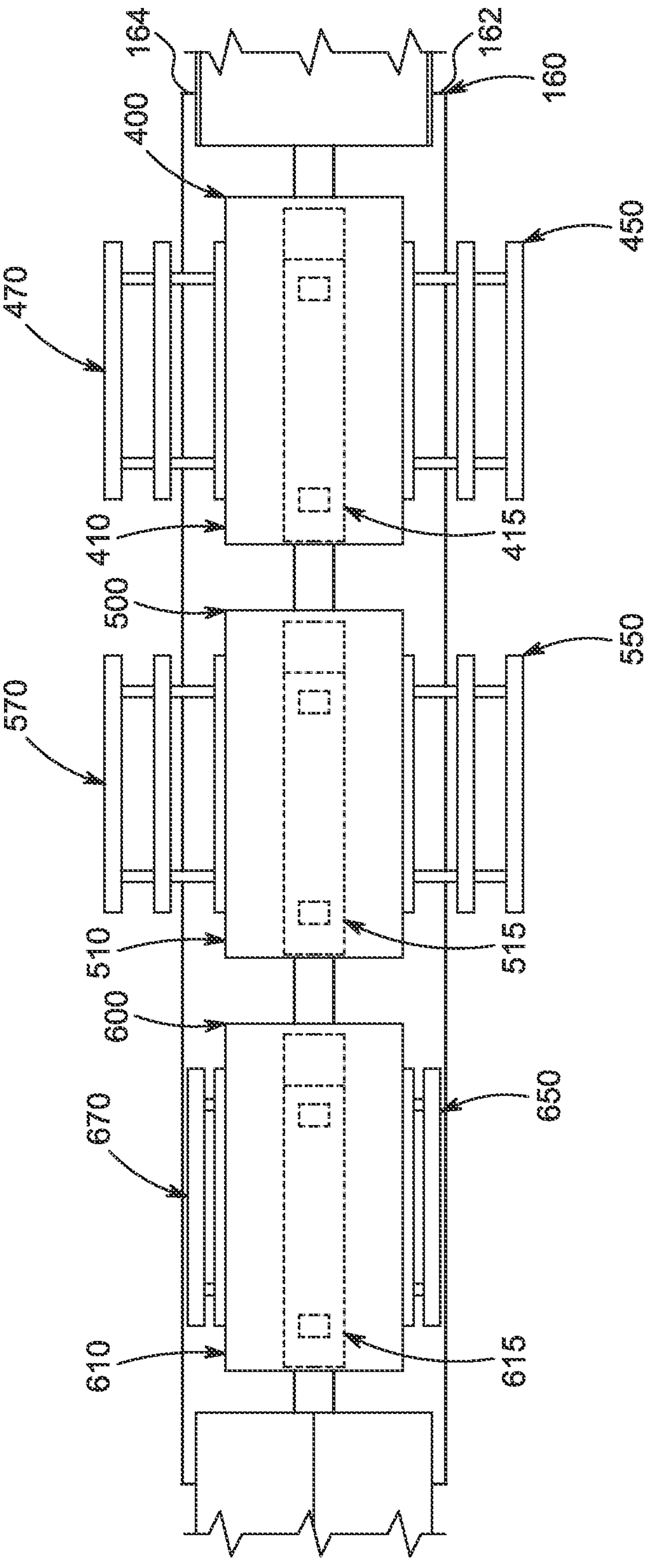

FIGS. 6E and 7E show the flap-suppressing-and-closing system 300 after the second case C2 has moved downstream past the second suppressing-and-closing device 500 but can still be partially engaged by and partially beneath the third suppressing-and-closing device 600 or just beyond such engagement. The first and second suppressing-and-closing devices 400 and 500 have reached their respective flap-suppressing-and-closing positions for the third case C3, and the third case C3 is on the central conveyor 160 and partially beneath the first suppressing-and-closing device 400.

Figure 6F:
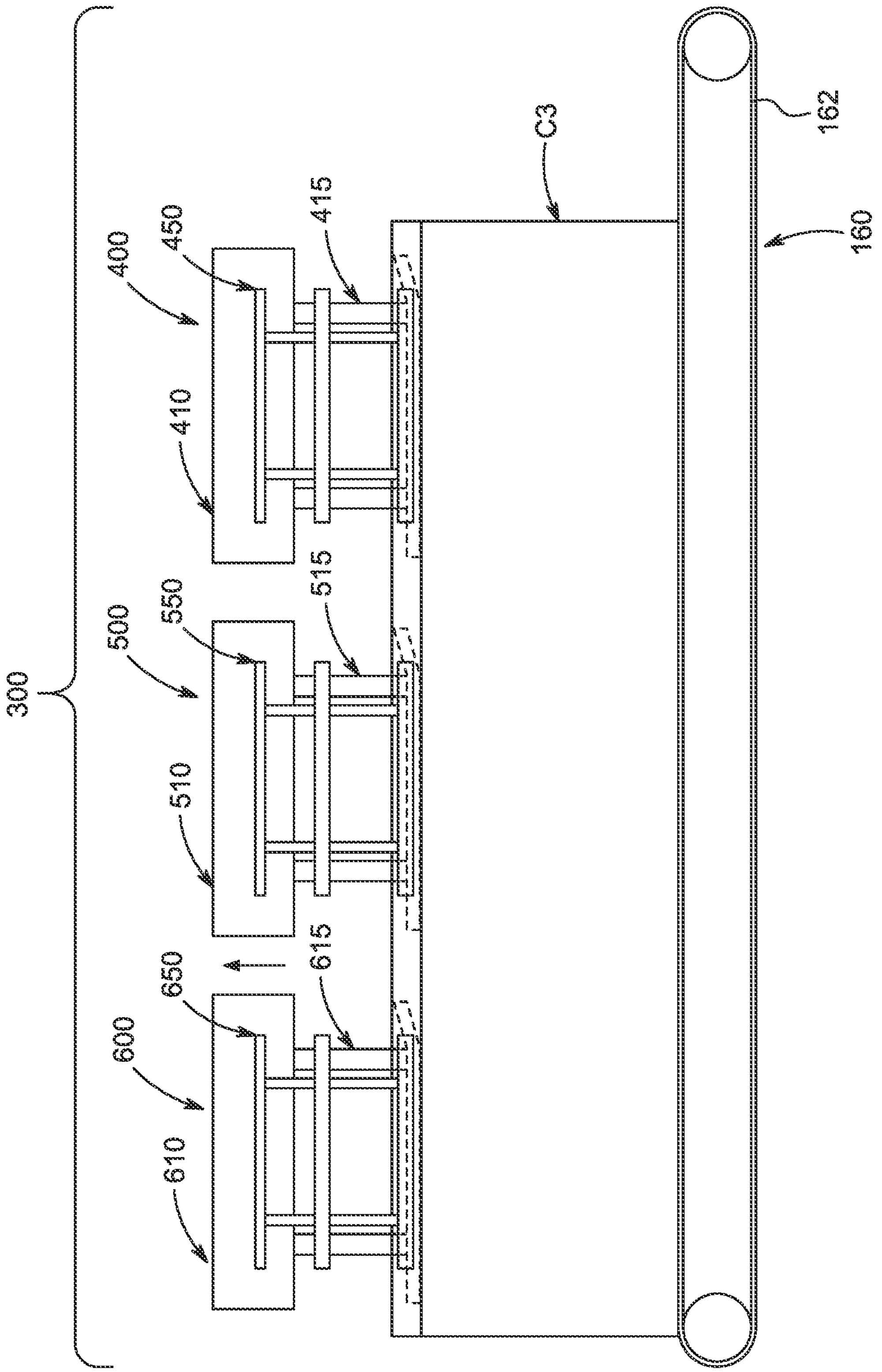
Figure 7F:
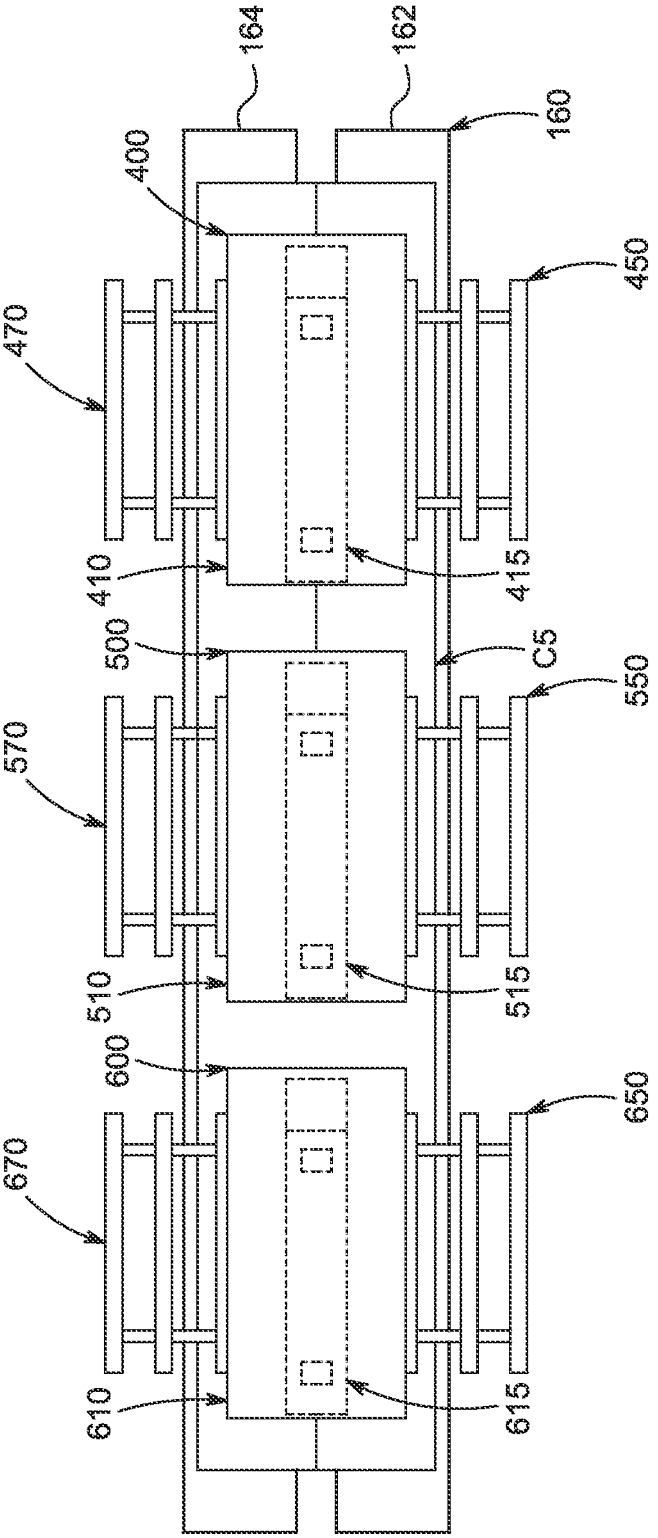

FIGS. 6F and 7F show the flap-suppressing-and-closing system 300 after the third case C3 is beneath the first, second, and third suppressing-and-closing devices 400, 500, and 600. At this point, the minor-flap suppressors 415, 515, and 615 of the first, second, and third suppressing-and-closing devices 400, 500, and 600 are suppressing the upper minor flaps of the second case C2, and the major-flap closers 450 and 470, 550 and 570, and 650 and 670 of the first, second, and third suppressing-and-closing devices 400, 500, and 600 have moved to their flap-engaging positions to close the upper major flaps of the third case C3.

At various points in time during the processes described above, the controller 900 can determine which suppressing-and-closing devices 400, 500, and 600 to position, reposition, and otherwise use and operate based on the size of each sequential case C processed by the case-handling system 120. As mentioned above, at each point in time, the controller 900 can determine the size of each case in any suitable manner, such as based on feedback from one or more of the sensors S or from an input received from an operator or another component of the packaging line.

In various alternative embodiments, the devices 400, 500, and 600 can be formed without the respective flap closers and thus function as flap-suppressing devices. In certain such embodiments, the flap closing operations can be performed by one or more other suitable flap closing devices such as via passive flap closing devices and/or methods.

The invention claimed is:

1. A case-handling system comprising:
- a conveyor;
- a minor-flap closer configured to close upper minor flaps of a case;
- a flap-suppressing-and-closing system downstream of the minor-flap closer and configured to maintain the upper minor flaps of the case closed and to close upper major flaps of the case, the flap-suppressing-and-closing system comprising:
  - a first flap-suppressing device downstream of the minor-flap closer and vertically movable relative to the conveyor; and
  - a second flap-suppressing device disposed between the minor-flap closer and the first flap-suppressing device and vertically movable relative to the conveyor, wherein the first and second flap-suppressing devices are vertically movable independently of one another;
- a case sealer downstream of the flap-suppressing-and-closing system and configured to seal the upper major flaps closed; and
- a controller operably connected to the conveyor to drive the conveyor and operably connected to the first and second flap-suppressing devices to independently vertically move the first and second flap-suppressing devices,
- wherein the controller is configured to, while the first flap-suppressing device is at a first flap-suppressing position and engaging closed upper minor flaps of a first case, cause the second flap-suppressing device to vertically move to a second flap-suppressing position different from the first flap-suppressing position in preparation for processing a second case.

2. The case-handling system of claim 1, wherein the controller is configured to:
- while causing the second flap-suppressing device to engage closed upper minor flaps of the second case, cause the first flap-suppressing device to vertically move into a position to engage the closed upper minor flaps of the second case.

3. The case-handling system of claim 2, wherein the controller is configured to:
- while causing the first flap-suppressing device to engage the closed upper minor flaps of the second case, cause the second flap-suppressing device to vertically move into a position to engage closed upper minor flaps of a third case.

4. The case-handling system of claim 1, further comprising a third flap-suppressing device vertically movable relative to the conveyor, wherein the controller is operably connected to the third flap-suppressing device to independently vertically move the third flap-suppressing device.

5. The case-handling system of claim 4, wherein the controller is configured to, while the first flap-suppressing device is at the first flap-suppressing position and engaging the closed upper minor flaps of the first case, cause the third flap-suppressing device to vertically move to a third flap-suppressing position different from the first flap-suppressing position in preparation for processing the second case.

6. The case-handling system of claim 1, wherein the first and second flap-suppressing devices each comprise a carriage and a minor-flap suppressor connected to and extending downwardly from the carriage.

7. The case-handling system of claim 6, wherein each of the minor-flap suppressors comprises a downwardly extending support and a minor-flap engager at a bottom end of the support.

8. The case-handling system of claim 7, wherein each of the minor-flap engagers comprises an upwardly extending angled forward section and a horizontal rearward section extending rearwardly from the forward section.

9. The case-handling system of claim 1, wherein the first and second flap-suppressing devices each comprise first and second upper-major-flap closers, and the controller is operably connected to the first and second upper-major-flap closers of the first and second flap-suppressing devices.

10. The case-handling system of claim 9, wherein the first and second flap-suppressing devices each comprise a carriage and a minor-flap suppressor connected to and extending downwardly from the carriage, and wherein the first and second upper-major-flap closers are connected to opposite sides of the carriage.

11. The case-handling system of claim 10, wherein each of the first and second upper-major-flap closers comprises a rotatable shoulder connected to the carriage, an upper arm connected at its upper end to the rotatable shoulder, an elbow connected to a lower end of the upper arm, a lower arm connected at its upper end to the elbow, a flap-engaging hand connected to a lower end of the lower arm, and a flap-closer actuator connected to the rotatable shoulder.

12. The case-handling system of claim 1, wherein the first and second flap-suppressing devices are identical.

13. The case-handling system of claim 1, wherein the first flap-suppressing device comprises a first minor-flap engager comprising an upwardly angled forward section and a horizontal rearward section extending rearwardly from the forward section and parallel to a direction of travel of the case, wherein the second flap-suppressing device comprises a second minor-flap engager comprising an upwardly angled forward section and a horizontal rearward section extending rearwardly from the forward section and parallel to the direction of travel of the case.

14. A case-handling system comprising:

a conveyor;

a first flap-suppressing device vertically movable relative to the conveyor and comprising first and second upper-major-flap closers;

a second flap-suppressing device vertically movable relative to the conveyor and comprising third and fourth upper-major-flap closers, wherein the first and second flap-suppressing devices are vertically movable independently of one another; and a controller operably connected to the conveyor to drive the conveyor and operably connected to the first and second flap-suppressing devices to independently vertically move the first and second flap-suppressing devices, wherein the controller is configured to, while the first flap-suppressing device is at a first flap-suppressing position and engaging closed upper minor flaps of a first case, cause the second flap-suppressing device to vertically move to a second flap-suppressing position different from the first flap-suppressing position in preparation for processing a second case, wherein the controller is operably connected to the first and second upper-major-flap closers of the first flap-suppressing device and to the third and fourth upper-major-flap closers of the second flap-suppressing device.

15. The case-handling system of claim 14, wherein the first flap-suppressing device comprises a first carriage and a first minor-flap suppressor connected to and extending downwardly from the first carriage, wherein the second flap-suppressing device comprises a second carriage and a second minor-flap suppressor connected to and extending downwardly from the second carriage, wherein the first and second upper-major-flap closers are connected to opposite sides of the first carriage, and wherein the third and fourth upper-major-flap closers are connected to opposite sides of the second carriage.

16. The case-handling system of claim 15, wherein the first upper-major-flap closer comprises a rotatable first shoulder connected to the first carriage, a first upper arm connected at its upper end to the rotatable first shoulder, a first elbow connected to a lower end of the first upper arm, a first lower arm connected at its upper end to the first elbow, a first flap-engaging hand connected to a lower end of the first lower arm, and a first flap-closer actuator connected to the rotatable first shoulder, wherein the second upper-major-flap closer comprises a rotatable second shoulder connected to the second carriage, a second upper arm connected at its upper end to the rotatable second shoulder, a second elbow connected to a lower end of the second upper arm, a second lower arm connected at its upper end to the second elbow, a second flap-engaging hand connected to a lower end of the second lower arm, and a second flap-closer actuator connected to the rotatable second shoulder.

* * * * *